(12) United States Patent
Lotze et al.

(10) Patent No.: US 6,591,208 B2
(45) Date of Patent: Jul. 8, 2003

(54) CORRECTION METHOD FOR A COORDINATE MEASURING APPARATUS

(75) Inventors: Werner Lotze, Dresden (DE); Ralf Bernhardt, Aalen (DE)

(73) Assignee: Carl-Zeiss-Stiftung, Heidenheim-Brenz (DE)

( * ) Notice: Subject to any disclaimer, the term of this patent is extended or adjusted under 35 U.S.C. 154(b) by 0 days.

(21) Appl. No.: 09/862,321

(22) Filed: May 23, 2001

(65) Prior Publication Data

US 2002/0029119 A1 Mar. 7, 2002

(30) Foreign Application Priority Data

May 23, 2000 (DE) .......................... 100 25 479

(51) Int. Cl.[7] .......................... G01C 17/38; G01P 21/00; G06F 19/00
(52) U.S. Cl. .......................... 702/95; 702/152
(58) Field of Search .................... 702/95, 152; 33/503, 33/504; 318/572, 632

(56) References Cited

U.S. PATENT DOCUMENTS

| | | | | |
|---|---|---|---|---|
| 4,333,238 A | * | 6/1982 | McMurtry .................... 33/503 |
| 4,796,195 A | * | 1/1989 | Haggerty .................... 318/572 |
| 4,819,195 A | * | 4/1989 | Bell et al. .................... 318/632 |
| 5,007,006 A | | 4/1991 | Taylor et al. | |
| 5,138,563 A | * | 8/1992 | Debitsch et al. .............. 702/95 |
| 5,152,072 A | * | 10/1992 | McMurtry et al. ............. 33/503 |
| 5,189,806 A | * | 3/1993 | McMurtry et al. ............. 33/503 |
| 5,471,406 A | * | 11/1995 | Breyer et al. ................. 33/503 |
| 5,594,668 A | * | 1/1997 | Bernhardt et al. ............. 33/504 |
| 5,610,846 A | | 3/1997 | Trapet et al. | |
| 5,832,416 A | * | 11/1998 | Anderson ..................... 702/95 |
| 5,966,681 A | * | 10/1999 | Bernhardt et al. .......... 702/152 |
| 6,449,581 B1 | * | 9/2002 | Ruck .......................... 702/152 |

FOREIGN PATENT DOCUMENTS

| | | |
|---|---|---|
| CH | 681 913 | 6/1993 |
| EP | 0 684 448 | 11/1995 |

OTHER PUBLICATIONS

"High–Speed Scanning auf Koordinatenmeßgeräten" by W. Lotze, Microtecnic Apr. 1993.
"Multidimensional measuring probe head improves accuracy and functionality of coordinate measuring machines" by W. Lotze, Measurement 13 (1994), pp. 91 to 97.
"Error compensation of touch trigger probes" by Q. Yang et al, Measurement, vol. 18, No. 1, 1996, pp. 47 to 57.

* cited by examiner

Primary Examiner—John Barlow
Assistant Examiner—Aditya S Bhat
(74) Attorney, Agent, or Firm—Walter Ottesen

(57) ABSTRACT

The invention is directed to a method for correcting the measuring results of a coordinate measuring apparatus wherein a workpiece is continuously scanned. The dynamic bending characteristic of the probe is determined or a multidimensional parameter field especially as a dynamic tensor (D). Corrective values are computed from the parameter field D while considering the acceleration of the probe ($\vec{b}$). Then, the measuring results are corrected with corrective values. To improve the accuracy of the method, the parameter field is the product of the static bending tensor ($N_T$) of the probe and the mass tensor ($M_T$+mE) of the probe and/or the parameter field describes the deviations normal to the workpiece surface by accelerating the probe.

20 Claims, 7 Drawing Sheets

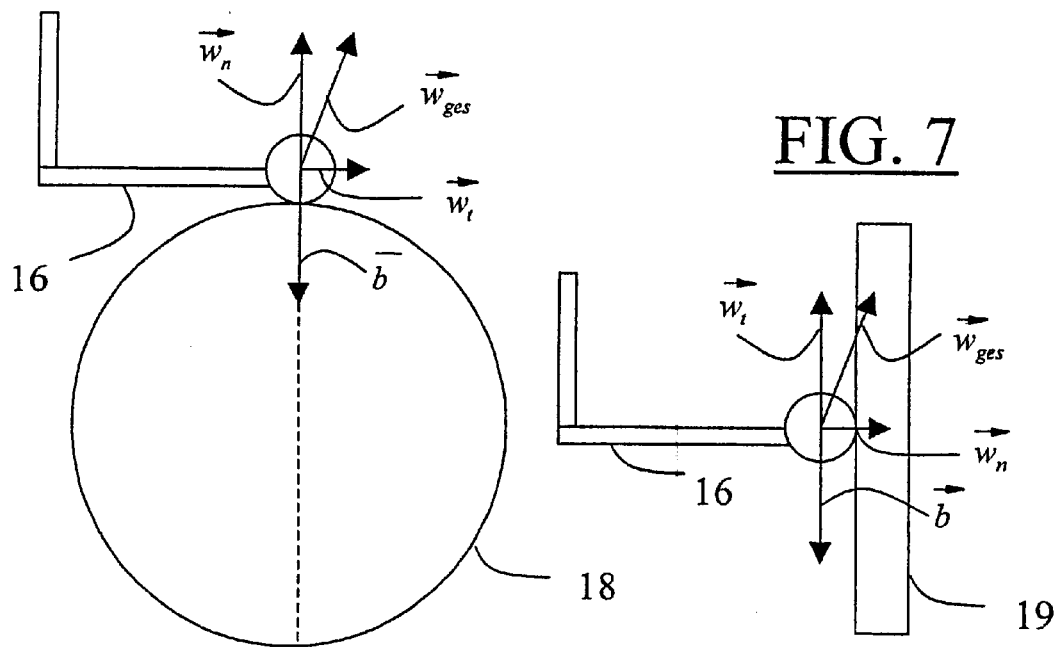

CORRECTION METHOD FOR A COORDINATE MEASURING APPARATUS

FIELD OF THE INVENTION

The invention relates to a method for correcting the measuring result of a coordinate measuring apparatus wherein a large piece is continuously scanned and a coordinate measuring apparatus for carrying out the method.

BACKGROUND OF THE INVENTION

A method of this kind is disclosed in U.S. Pat. No. 5,594,668. Here, the dynamic stiffness of a probe is to be determined in that first a teaching ring or a calibration ball is scanned at different velocities with a very stiff probe. Thereafter, the teaching ring or the calibration ball is scanned with the probe, which is to be tested, in the same manner as with the very stiff probe. The dynamic stiffness is determined from the differences of the measurement values of the very stiff probe and of the probe to be calibrated. From this, and in a later measuring sequence for the probe, corresponding corrective values are determined while considering the acceleration of the probe and the measurement results are correspondingly corrected.

The described method has provided good results in the past. However, it has been shown that measurement errors, which result from the dynamic bending of probes can be corrected only to a limited extent with the described method for the continuously increasing demands as to accuracy.

SUMMARY OF THE INVENTION

It is an object of the invention to provide a method for correcting measurement errors which result because of the dynamic deformation of the probe pin when scanning a workpiece. It is another object of the invention to provide a coordinate measuring apparatus for carrying out the method of the invention.

The method of the invention is for correcting a measurement result of a coordinate measuring apparatus wherein a workpiece is continuously scanned with a probe having a dynamic bending characteristic. The method includes the steps of: determining a parameter field defining the dynamic bending characteristic of the probe from at least one of the following: a product of the static bending tensor ($N_T$) of the probe and the mass tensor ($M_T$+mE) of the probe; and, deviations accompanying an acceleration of the probe normal to the surface of the workpiece; computing corrective values from the parameter field while considering the acceleration ($\vec{b}$) of the probe; and, correcting the measurement with the corrective values.

According to a feature of the method of the invention, the parameter field, which defines the dynamic stiffness of the probe, is described by the product of the static bending tensor of the probe and the mass tensor of the probe and/or, specifically, the parameter field is defined by the deviations with the acceleration of the probe normal to the workpiece surface.

Considerably better measuring results are obtained by the correction of the measuring results with a corresponding parameter field. A very good measuring result results when the parameter field defines both of the above-mentioned characteristics, that is, that the parameter field includes a component field which is the product of the static bending tensor of the probe and the mass tensor of the probe as well as a component field which defines only the deviations with the acceleration of the probe normal to the workpiece surface.

The measuring results can additionally be improved slightly when the parameter field additionally also includes a component field which describes only the deviations for tangential acceleration of the probe relative to the workpiece surface.

The parameter field, that is, the parameters of the parameter field, can here be determined either by an analytic computation and/or by dynamic calibration. It is here to be noted that, for the parameter field, only at least one of the component fields need be calibrated for correction, especially when the parameter field consists of several component fields.

For the case that the parameter field defines the deviations for the acceleration of the probe normal to the workpiece surface, the parameters of the parameter field can be advantageously determined by continuous scanning of a rotationally-symmetrical calibration body having different velocities. The rotationally-symmetrical calibration body can advantageously be a calibration ball. At least three large circles are scanned at different speeds for determining the parameters of the parameter field.

When the parameter field additionally defines the deviations for tangential acceleration of the probe relative to the workpiece surface, the parameters of the parameter field can be determined in that a curved path is scanned on a calibration plane which is aligned parallel to the workpiece surfaces to be measured. The scanning takes place in accordance with at least one of the following principles:

a) one and the same curved path is scanned at different velocities; or, b) the path is scanned at a fixed velocity and the path has different curvatures.

The parameters of the parameter field can be determined by measuring a small circle on a calibration ball at different speeds in at least one calibration plane.

The measuring points, which are recorded during calibration or are recorded in later measuring operations, can be validated as valid or invalid in dependence upon the measured acceleration and/or the measured measurement force. For validation, an angle between the acceleration vector or measurement force vector and the normal vector of the workpiece surface can be computed at the measurement point and a measurement point can be validated as being valid when the angle exceeds or drops below a previously defined value.

The maximum permissible measuring velocity of the coordinate measuring apparatus can be advantageously determined while considering the dynamic stiffness of the probe and of the probe mass.

BRIEF DESCRIPTION OF THE DRAWINGS

The invention will now be described with reference to the drawings wherein:

FIG. 6 shows scanning along a circular path on a sphere;

FIG. 7 shows scanning of the circular path of FIG. 6 along a planar surface of a workpiece;

FIGS. 8 and 9 are perspective views for explaining the basic principle for the calibration of the symmetrical dynamic matrix $D_S$;

DESCRIPTION OF THE PREFERRED EMBODIMENTS OF THE INVENTION

Figure 1:
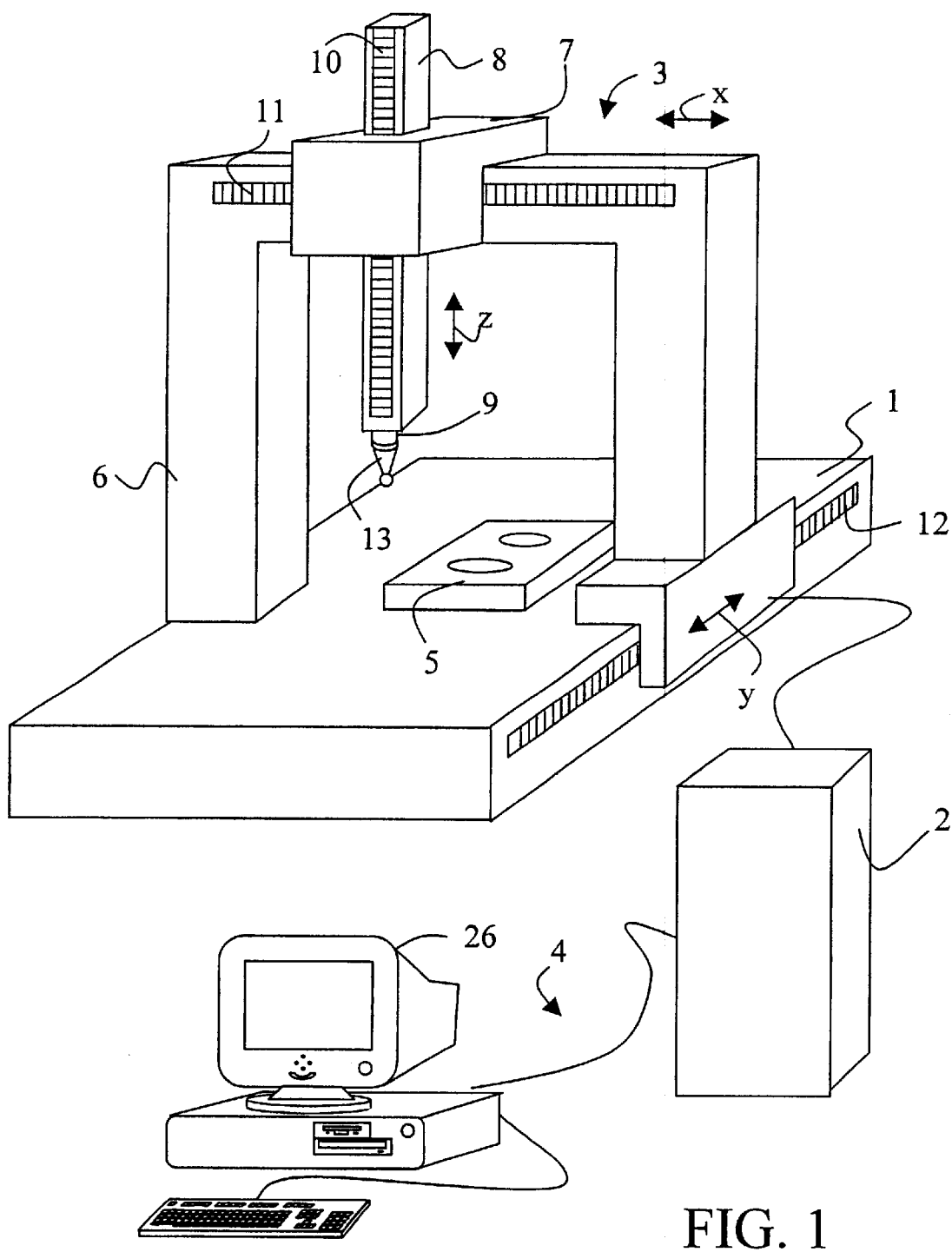
FIG. 1 is a perspective view of a coordinate measuring apparatus of the portable type.

FIG. 1 shows a coordinate measuring apparatus of the so-called portal type by way of example. The coordinate measuring apparatus includes a measuring table 1 on which a workpiece 5, which is to be measured, is disposed. The coordinate measuring apparatus includes a mechanical assembly 3 in the form of a portal mechanical assembly. A probe head 9 is moved via the portal assembly in the three coordinate directions (x, y, z). The portal 6 of the mechanical assembly 3 is movably journalled in a first direction identified by (y). A transverse slide 7 is movably journalled on the horizontal member of portal 6 so as to be movable in the x direction. The transverse slide 7 accommodates the vertical spindle 8 so as to be movable in the z direction. A measuring probe head 9 is attached to the lower end of the spindle 8. Scales (10, 11, 12) are attached to the mechanical assembly 3 in the three coordinate directions (x, y, z). These scales are scanned by scanning heads (not shown) so that the machine positions ($x_M$, $y_M$, $z_M$) can be detected. More specifically, the position of the mechanical assembly 3, and therefore of the probe head 9, is detected in the three coordinate directions (x, y, z).

The probe head 9, in turn, includes a probe head mechanic deflectable in three coordinate directions. Via the probe head mechanic, the probe pin 13 is moved out of its rest position in the coordinate directions (x, y, z) relative to the probe head 9. Furthermore, measuring devices are provided via which the probe pin deflection ($x_T$, $y_T$, $x_T$) can be measured, that is, the deflection of the probe pin 13 relative to the probe head 9 in the three coordinate measuring directions (x, y, z). Furthermore, measuring force generators can be provided in the probe head 9 via which a measuring force can be superposed onto the probe pin 13 in the coordinate directions.

The mechanical assembly 3 is additionally provided with drives (not shown) via which the mechanical device can be displaced in the three coordinate directions.

In order to carry out a measuring sequence, the coordinate measuring apparatus further includes a control and evaluation unit 4 which includes, for example, a computer 26 as well as a control 2. For carrying out the measuring sequence, important data is transmitted by the computer 26 to the control 2 for carrying out the measuring sequence. This data can, for example, include the desired form of the workpiece 5 which is to be measured, the center point of the probe ball of the probe pin 13 in the machine coordinate system or the measuring force to be adjusted with which the probe pin 13 is pressed against the workpiece 5. From this data, so-called drive desired values are computed in accordance to which the mechanical assembly 3 is moved so that the probe pin 13 is continuously guided over the surface of the workpiece 5 for example, to measure one of the two bores of the workpiece 5 or to measure the top surface of the workpiece 5 or to carry out a calibration according to the invention as will be described hereinafter in detail. The machine positions ($x_M$, $y_M$, $z_M$), which are recorded during the measuring sequence by the scales (10, 11, 12), and the probe pin deflections ($x_T$, $y_T$, $z_T$), which are measured in the probe head 9, are transmitted by the control 2 to the computer 26. In the computer 26, the machine positions ($x_M$, $y_M$, $z_M$) and the probe pin deflections ($x_T$, $y_T$, $z_T$) are mathematically combined and the measuring points determined and evaluated.

In such a continuous scanning of a workpiece, accelerations occur for a curved path which is to be scanned as well as for changing scanning speeds. This leads to dynamic deformations because of the mass moment of inertia of the moved parts and the limited stiffness of the components of the coordinate measuring apparatus.

Figure 2:
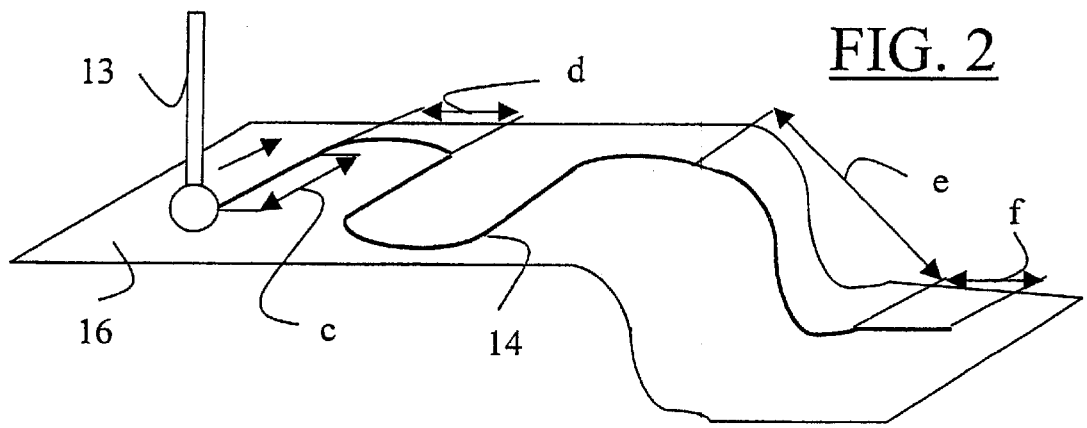
FIG. 2 is a schematic showing the acceleration conditions which can occur when scanning along a desired path.

The three different acceleration states which can occur when scanning along a desired path are explained below with respect to the schematic of FIG. 2.

Starting accelerations and braking decelerations occur in the direction of the path 14 to be traveled at the start (c) and at the end (f) of the path 14 to be scanned. In this region, the scanning conditions are characterized by large probe deflections and control fluctuations as well as by the acceleration in the direction of the path because of the control performance of the machine. The probe head remains in a state of inertia at start and stop because of a non-present superposition of force in the path direction.

Furthermore, accelerations tangential to the workpiece surface occur in region (d) because the path is curved on the workpiece surface which is otherwise planar in this region. These accelerations have no normal component with respect to the workpiece surface.

In addition, accelerations normal to the workpiece surface can occur when the workpiece surface is curved as shown, for example, by the region (e) of the path 14 to be scanned.

The occurring acceleration always is directed in a direction toward the curvature center point in the last two cases, that is, for a curved path and lies in the osculating plane. This acceleration has the magnitude:

$$|\vec{b}|=|\vec{v}|^2 r \qquad \text{Equation 1}$$

wherein $\vec{v}$ is the travel speed and (r) is the radius of curvature of the path. The acceleration vector $\vec{b}$ results as the second derivative of the path coordinates with respect to time:

$$\vec{b}=\begin{pmatrix} b_x \\ h_y \\ h_z \end{pmatrix}=\begin{pmatrix} \ddot{x} \\ \ddot{y} \\ \ddot{z} \end{pmatrix} \qquad \text{Equation 2}$$

This acceleration vector $\vec{b}$ is numerically computed within the control but can, in principle, also be determined via acceleration sensors.

It has been shown that especially the deformation of the probe pin 13 also leads to considerable incorrectness of the measuring results because of the accelerations described just above. The deformations of the probe pin 13, which occur for corresponding accelerations, are dependent upon the mass of the probe pin 13 and its stiffness as well as, inter alia, on the mass distribution of the probe pin as indicated in FIGS. 3 and 4.

Figure 3:
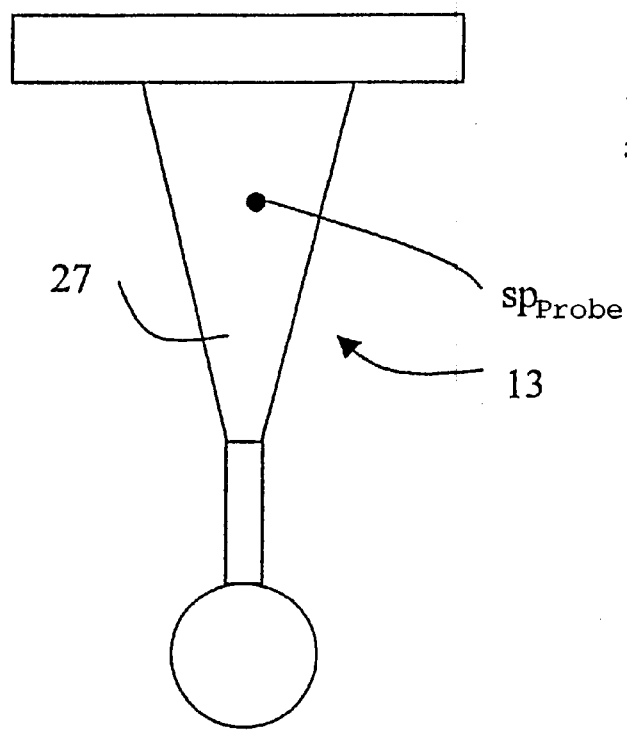
FIG. 3 is a schematic representation of a probe pin.
Figure 4:
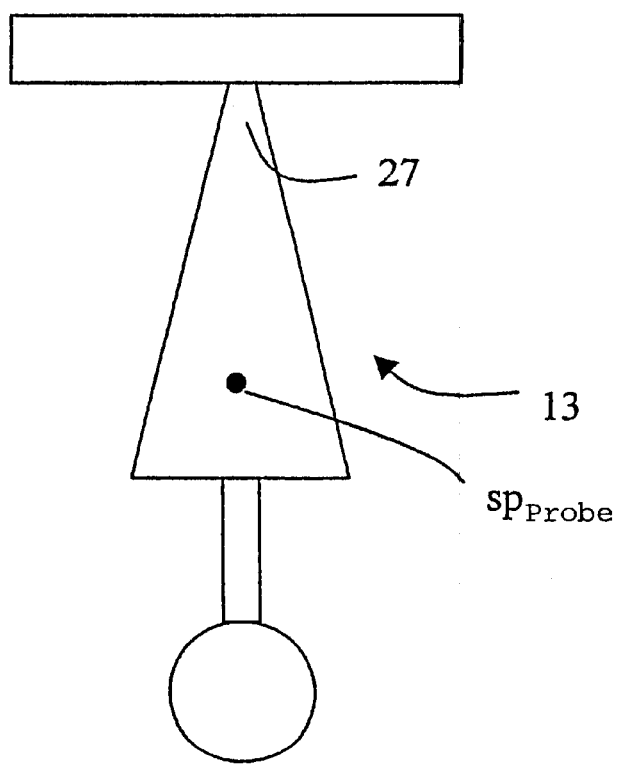
FIG. 4 is a schematic representation of a probe pin which is configured similarly to the probe pin of FIG. 3 and wherein the conically truncated shaped component faces downwardly.

FIGS. 3 and 4 are schematic representations of two probe pins 13 which have the same static bending stiffness as well as the same mass. Only the truncated conical shaped component 27 is orientated with its base surface upwardly in the case of FIG. 3; whereas, in the case of FIG. 4, the component is directed downwardly. In this way, the mass center of gravity ($sp_{probe}$) is higher in the case of FIG. 3 than in the case of FIG. 4 so that the two probe pins 13 deform completely differently for the same accelerations. This has the consequence that for each individual probe pin, which is used in measurements on the coordinate measuring apparatus, its own corrective data must be provided via which, inter alia, the deformation of the probe pin is corrected.

Figure 5:
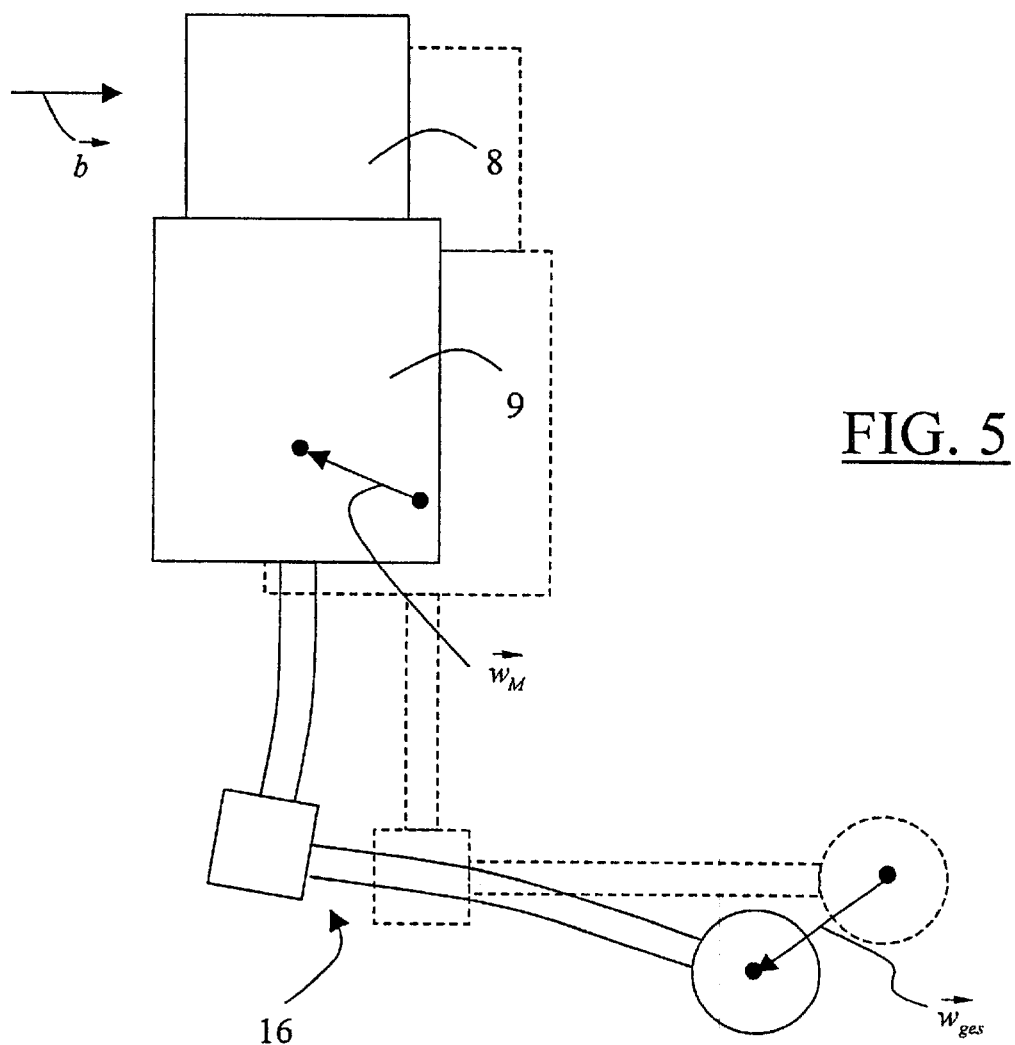
FIG. 5 is a schematic showing the deformation of a probe pin when the probe head is moved along a curved path.

The deformation resulting with a curved path takes place as described with respect to FIG. 5 in which a somewhat more general probe pin 16 is used for explaining the deformation processes. FIG. 5 shows the deformation of the probe pin 16 when the probe head 9 is moved on a curved path, for example, on a horizontally aligned circular path. The computation of the displacement $\vec{w}_{ges}$ of the probe ball as a consequence of the acceleration $\vec{b}$ takes place under the following assumptions:

a) The spindle 8 with the probe head housing of the probe head 9 is subjected to a parallel displacement as a consequence of inertial forces; whereas, the inclination of the spindle is negligible. This error is already corrected in the control.

b) Deformation effective inertial forces arise because of the movable probe pin masses suspended in the probe pin, that is, for example, spring parallelograms which movably journal the probe pin 16 relative to the probe head 9 or a probe pin exchange holder which exchangeably accommodates the probe pin 9 on the probe head mechanic as well as by the distributed mass of the probe pin 16. In this context, it is noted that the term "probe" herein always includes the probe pin 16 as well as the parts in the probe head connected to the probe pin 16. These parts are movably journalled relative to the probe head housing.

c) The displacement of the movable parts of the probe head 9 as well as the deformation of the probe pin 16 effect the dynamic deformation vector $\vec{w}_{ges}$ which is interpreted as dynamic probe bending.

In order to analytically describe the deformation vector $\vec{w}_{ges}$ as a consequence of the acceleration vector $\vec{b}$, one can introduce a generally linear starting point which makes possible an affinitive imaging between both vectors ($\vec{w}_{ges}$, $\vec{b}$).

$$\vec{w}_{ges} = D * \vec{b} \quad \text{Equation 3}$$

wherein D represents the following dynamic matrix:

$$D = \begin{pmatrix} d_{11} & d_{12} & d_{13} \\ d_{21} & d_{22} & d_{23} \\ d_{31} & d_{32} & d_{33} \end{pmatrix} \quad \text{Equation 4}$$

As already described above, there are two dominating acceleration directions, namely, an acceleration direction normal to the workpiece surface and an acceleration direction tangential to the workpiece surface. It is therefore practical to split up the dynamic matrix D as follows into the symmetric component $D_s$ and the antisymmetric component $D_a$. The total dynamic matrix D results as the sum of the dynamic matrices $D = D_s + D_a$ $$D_s = \frac{1}{2}(D + D^T) = \begin{pmatrix} d_{11} & d_{s12} & d_{s13} \\ d_{s12} & d_{22} & d_{s23} \\ d_{s13} & d_{s23} & d_{33} \end{pmatrix} \quad \text{Equation 5}$$

$$D_a = \frac{1}{2}(D - D^T) = \begin{pmatrix} 0 & d_{a12} & d_{a13} \\ -d_{a12} & 0 & d_{a23} \\ -d_{a13} & -d_{a23} & 0 \end{pmatrix} \quad \text{Equation 6}$$

In evaluating the effect of the dynamic deformation, it is to be noted that the deformation vector $\vec{w}_{ges}$ is only effective with its normal component $\vec{w}_n$ which results as a scalar product of the deformation vector $\vec{w}_{ges}$ and the particular surface normal ($\vec{n}$). Starting from the two acceleration states, which occur for a curved path, there results the following allocation of the two supplementary matrices $D_s$ and $D_a$ with a more precise analysis.

The symmetrical supplementary matrix $D_s$ defines the effective errors for the case that the acceleration $\vec{b}$ operates normal to the workpiece surface. That is the case, for example, when cylinders or bores are measured.

The antisymmetrical supplementary matrix $D_a$ defines, in contrast, the dynamic errors for the case that the acceleration $\vec{b}$ operates tangentially to the workpiece surface. This is the case, for example, when a planar surface is measured along a curved path.

FIGS. 6 and 7 show the two boundary cases when scanning along a same circular path. In the case of FIG. 6, the circular path scanned is on a sphere 18. In the case of FIG. 7, the same circular path is scanned along a planar surface of a workpiece 19. In both cases, the same deformation components of the same deformation vector $\vec{w}_{ges}$ have different effects. The vertical deformation component (identified in FIG. 6 by $\vec{w}_n$) leads in the case of FIG. 6 to the situation that the probe pin 16 is deformed in the direction of the surface normal. The same deformation component (identified by $\vec{w}_t$ in FIG. 7) has, in the case of FIG. 7, the consequence that the probe pin 16 is deformed tangentially to the surface of the workpiece 19. The two supplementing matrices $D_a$ and $D_s$ do not influence each other in the two boundary cases shown in FIGS. 6 and 7.

Comprehensive test measurements have shown that the primary component of the dynamic deformation can be described exclusively by a dynamic matrix $D_M$ which defines the deformation which results from the mass of the probe pin 16 as well as the masses of the movable parts of the probe head 9 in the different directions.

The remaining residual deviations can then be described by the symmetric supplementing matrix $D_s$ and the antisymmetric supplementing matrix $D_a$.

Proceeding from the above, the following equation results for the deformation vector $\vec{w}_{ges}$ in dependence upon the acceleration vector $\vec{b}$:

$$\vec{w}_{ges} = \{N_T(M_T + mE) - A_T + A_M\}\vec{b} = \{D_M + D_s + D_a\}\vec{b} = D\vec{b} \quad \text{Equation 7}$$

wherein:

$N_T$ is the static yielding matrix;

$M_T$ is the mass matrix of the movable parts of the probe head;

E is a unity matrix;

m is the mass of the probe pin;

$A_T$ is the deformation matrix which defines the deformation of the probe pin which results from the spatial distribution of the probe pin mass;

$A_M$ is the matrix which defines possible residual errors in the correction of the dynamic deformation of the coordinate measuring apparatus;

$D_M$ is the dynamic matrix comprising the probe pin mass and the mass of the movable parts of the probe head;

$D_s$ is the symmetric supplementing matrix; and, $D_a$ is the antisymmetrical supplementary matrix.

This result is very essential for the realization of the correction of the dynamic errors of the coordinate measuring apparatus and leads to the following conclusion:

The dynamic matrix $D_M$ can be computed directly as an approximated $D_0$ of the dynamic matrix D when knowing the probe pin mass (m) from the known mass matrix $M_T$ of the movable parts of the probe head and of the static yielding matrix $N_T$. This matrix describes with a good approximation the symmetrical as well as the antisymmetrical components of the dynamic matrix D. A separate calibration for this matrix $D_0$ is not required.

The symmetrical supplementing matrix $D_s$ can, after the computation of the dynamic matrix $D_0$, be determined by means of a calibration on a rotationally-symmetric test body, for example, a sphere, as is described further below. The measurement values, which were determined for the calibration of the symmetrical supplementing matrix $D_s$ are corrected already using the dynamic matrix $D_0$.

The antisymmetrical supplementing matrix $D_a$ is calibrated in that a calibration body having a plane of defined spatial orientation is scanned. The measurement values recorded for calibration are likewise already corrected utilizing the dynamic matrix $D_0$ and the symmetrical supplementing matrix $D_s$.

Determining the Dynamic Matrix ($D_M = D_0$)

As described above, the dynamic matrix $D_M$ is computed as follows: $D_M = N_T(M_T + mE)$.

Here, $N_T$ is the static yielding matrix which describes the direction-dependent static stiffness of the probe pin 16 and of the movable parts of the probe head 9. This yielding matrix can, for example, be computed by the finite element method. Alternatively, the yielding matrix can be determined via a corresponding calibration as is described in the publication of Prof. W. Lotze entitled "Multidimensional Measuring Probe Head Improves Accuracy and Functionality of Coordinate Measuring Machines" (1994), Measurement No. 13, pages 91 to 97, or in the article of Prof. W. Lotze entitled "High-Speed Scanning auf Koordinatenmessgeräten" (Microtecnic No. 4).

The parameter $M_T$ represents a mass matrix which contains the particular masses of the movable parts of the probe head in the three coordinate directions (x, y, z). The masses for the particular directions can be determined by computation in that the masses of the individual components are measured and then, for each of the three coordinate directions (x, y, z), the masses of the components movable in the particular direction are added together. Alternatively, the masses can, for example, also be determined in that the probe head is accelerated without the probe pin in a direction and, correspondingly, a counterforce is generated via the mass force generators located in the probe head in such a manner that the movable parts in the probe head remain in their rest position. The mass of the probe head in the particular direction can be computed from the superposed measuring force and the acceleration via the relationship $F = m \cdot a$.

The mass of the probe pin 16 is buried in the quantity (m)

$$\text{which is multiplied by the unity matrix} \left( E = \begin{pmatrix} 1 & 0 & 0 \\ 0 & 1 & 0 \\ 0 & 0 & 1 \end{pmatrix} \right)$$

so that a matrix is obtained from the scalar mass (m).

Calibration of the Symmetrical Supplementing Matrix ($D_s$)

The selected basic principle for the calibration of the symmetrical dynamic matrix $D_s$ is explained with respect to FIG. 8. If, as shown by way of example in FIG. 8, a sphere 18 is statically or quasi statically measured (that is, the measuring velocity $v_1$, which is used to scan the sphere 18, is very small), then all measuring points lie on an ideal sphere. In contrast, a measurement at higher velocity $v_s$ yields measuring points on which the dynamic deformation is superposed so that the sphere then appears as an ellipsoid. This deviation has to be determined at different locations of the sphere 18 as a function of the acceleration $\vec{b}$ and the sought after supplementing matrix $D_s$ computed therefrom.

So that the computation will be numerically stable, the sphere 18 has to be measured in a sufficiently dense network on the side accessible to the probe pin 16. The measurement along three large circles (20, 21, 22), which intersect approximately perpendicularly, has been shown to be adequate. One large circle 21 is to be measured completely and the other two large circles (20, 22) are each to be measured at least over 180°. The three large circles (20, 21, 22) are measured each with two different measuring velocities ($v_1$, $v_s$).

For the determination of the coefficients of the symmetrical dynamic matrix $D_s$, one proceeds as described below.

The center point $\vec{m}_k$ and radius $r_k$ of the compensation sphere are determined from the quasi-static measurements at a very low measurement velocity $v_1$. Thereafter, the sphere 18 is measured along the same path at a high measuring velocity $v_s$. The sought after six coefficients are computed in accordance with the method of smallest error squares from the deviations of the measured measurement values compared to the specific compensating sphere.

Figure 11:
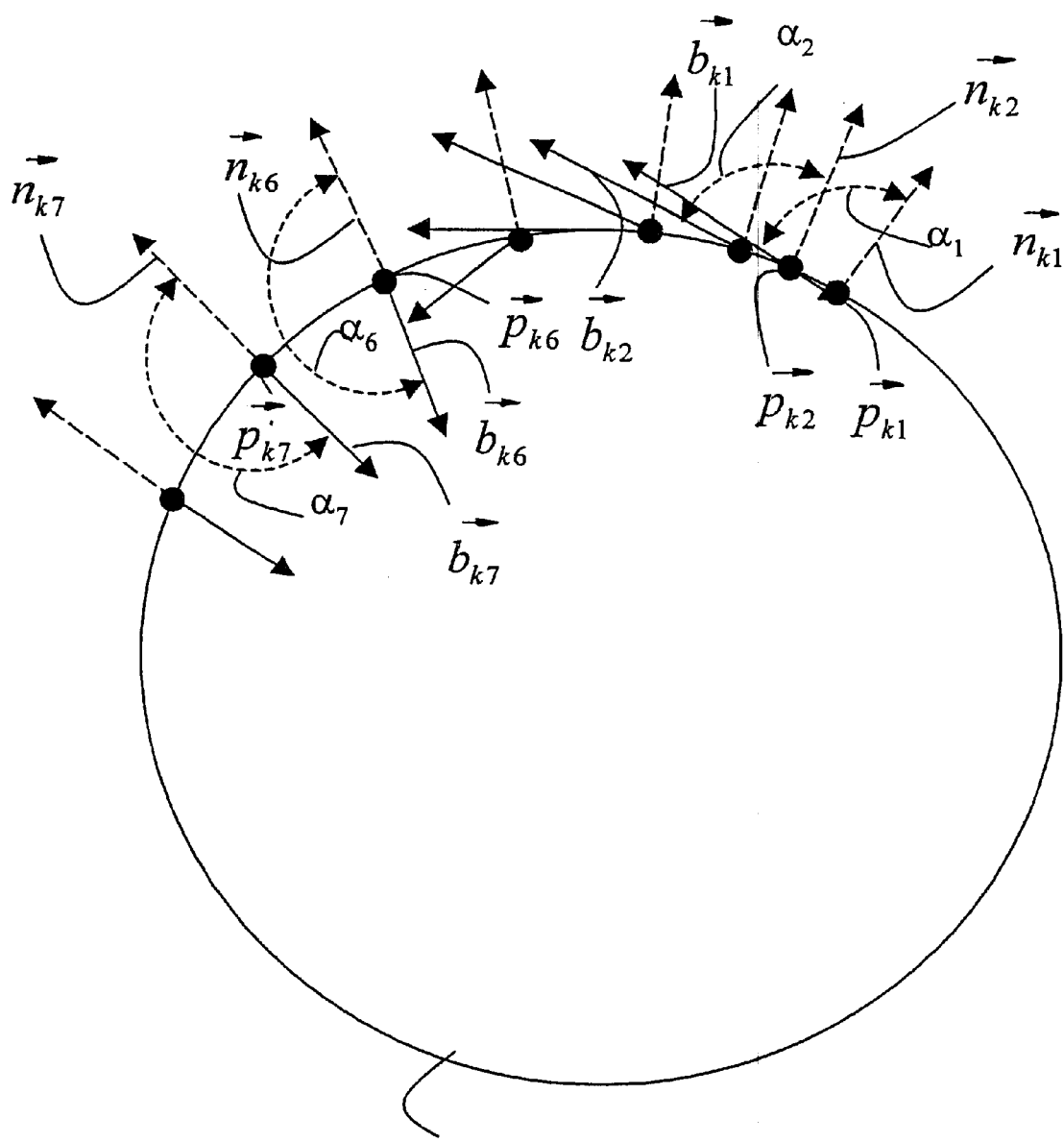
FIG. 11 is a schematic for explaining the basic principle of a data validation for carrying out a calibration.

Before the measurement points $p_{ki}$, which are recorded at the high measurement velocity $v_s$, are evaluated, a data validation should be undertaken which validates the measurement points as valid or invalid. Reference is made to FIG. 11 for an explanation of the principle of this data validation wherein the measurement points ($\vec{p}_{k1}$, $\vec{p}_{k2}$, et cetera), which are recorded sequentially on the circle, are shown. Furthermore, the particular surface normal ($\vec{n}_{k1}$, $\vec{n}_{k2}$, et cetera) is shown for each measurement point as is the acceleration ($\vec{b}_{k1}$, $\vec{b}_{k2}$, et cetera) superposed by the mechanical assembly 3 of the coordinate measuring apparatus. The probe head 9 is at rest at the first measurement point $\vec{p}_{k1}$ and is then accelerated into its high measurement velocity $v_s$. As can be seen from the first measurement points ($\vec{p}_{k1}$, $\vec{p}_{k2}$), the particular acceleration vectors ($\vec{b}_{k1}$, $\vec{b}_{k2}$, et cetera) of the first measurement points ($\vec{p}_{k1}$, $\vec{p}_{k2}$) are directed essentially tangential to the circle because here essentially only the start acceleration is effective. After the probe head 9 gradually reaches its high measurement velocity $v_s$, the acceleration vectors rotate more and more in the radial direction because, on the one hand, the portion of the tangential start acceleration becomes continuously less and, on the other hand, the radial acceleration becomes ever higher because of the curved path. At the measurements points ($\vec{p}_{k6}$, $\vec{p}_{k7}$), the probe head 9 has reached the high measurement velocity $v_s$ so that acceleration vectors ($\vec{b}_{k6}$, $\vec{b}_{k7}$, et cetera) are now parallel to the normal vectors ($\vec{n}_{k6}$, $\vec{n}_{k7}$, et cetera). Then, the acceleration becomes effective in the normal direction because of the curved path so that only now is it purposeful to use the recorded measurement points for calibration.

For this reason, the angle $\alpha_i$ between the normal vectors and the acceleration vectors, respectively, is evaluated in order to determine the measurement points as valid or invalid. As can be seen by the first two measurement points ($\vec{b}_{k1}$, $\vec{b}_{k2}$), the angles ($\alpha_1$, $\alpha_2$) amount to approximately 90°. In the case of the measurement points ($\vec{p}_{k6}$, $\vec{p}_{k7}$), the angles ($\alpha_6$, $\alpha_7$) are approximately 180°. The check can, for example, take place in such a manner that only measurement points are determined as valid where the particular angle ($|\alpha_i| \geq 150°$).

The above-described data validation can also be carried out completely in the same manner with the measured measurement values referred to the measurement force superposed on the workpiece. Here, the angle between the measurement force vector and the particular normal vector is to be formed.

The described data validation should be used for the calibration of the dynamic tensors as well as in the later measurement sequence.

Figure 9:
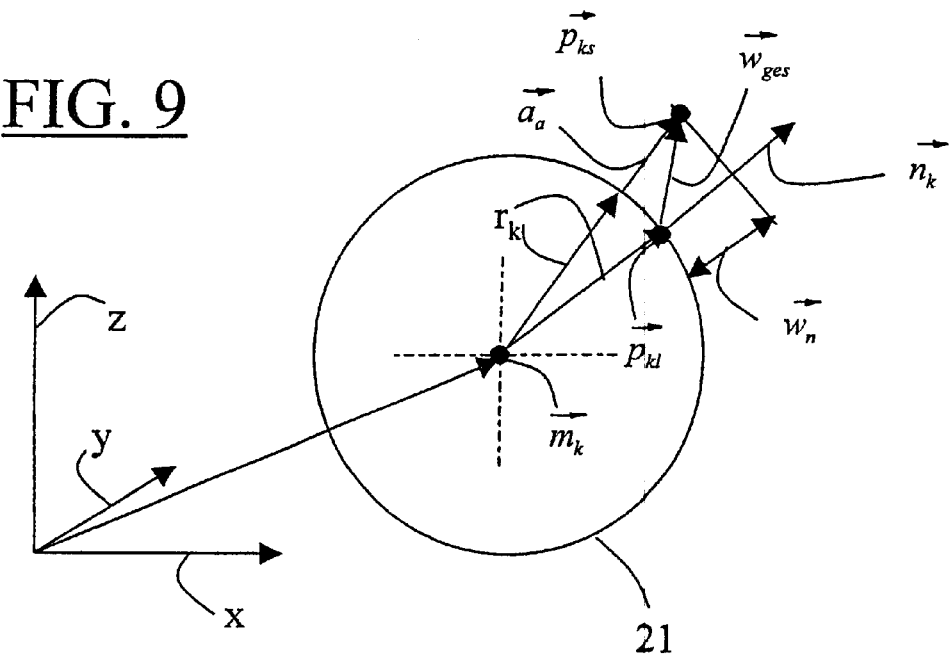

With respect to FIG. 9, it will now be explained how the parameters of the symmetrical supplementing matrix $D_s$ are determined from the measurement points measured at the high velocity. For the perpendicular spacing $\vec{a}_a$ of a measurement point ($\vec{p}_{ks}=(x_p, y_p, z_p)^T$), which is measured at high scanning velocity $v_s$, to the specific compensating sphere having the center point ($\vec{m}_k=(x_k, y_k, z_k)^T$) and the radius $r_k$, the following applies:

$$a_a = |\vec{p}_{ks} - \vec{m}k| - r_k \qquad \text{Equation 8}$$

On the other hand, from model equation 7, the following applies for the perpendicular distance ($a_a \approx w_n$) of measurement point $\vec{p}_{ks}$ in the direction of the normal vector $\vec{n}$:

$$w_n = \vec{n}^T \vec{w}_{ges} = \vec{n}^T D_s \vec{b} \qquad \text{Equation 9}$$

The unknown coefficients $d_{sij}$ of the matrix $D_s$ in equation 9 are determined by optimization in accordance with the method of least squares.

$$Q = \sum_{i=1}^{n} (a_{ai} - w_{ni})^2 \Rightarrow \text{Min} \qquad \text{Equation 10}$$

The solution for the parameter vector $\vec{d}$, which contains the parameters of the symmetrical supplementing matrix, includes:

$$\vec{d} = (d_{11} d_{s12} d_{13} d_{22} d_{s23} d_{33}) \qquad \text{Equation 11}$$

and is obtained from the following normal equation system $$\sum_{i=1}^{n} (J_i^T J_i) \vec{d} = \sum_{i=1}^{n} J_i^T a_{ai} \qquad \text{Equation 12}$$

with the Jacobi matrix (J) as well as the acceleration vector $\vec{b}$ and the normal vector $\vec{n}$ for each individual measurement point $i = 1 \ldots n$:

$$J = (b_x n_x \; b_y n_x + b_x n_y \; b_z n_x + b_x n_z \; b_y n_y \; b_z n_y + b_y n z \; b_z n_z) \qquad \text{Equation 13}$$

$$\vec{b} = (b_x \; b_y \; b_z)^T \quad \vec{n} = (n_x \; n_y \; n_z)^T \qquad \text{Equation 14}$$

The direct computation of the parameter vector $\vec{d}$ is possible in one step because of the linearity of equation 10.

Calibration of the Antisymmetrical Dynamic Matrix ($D_a$)

The calculation of the three coefficients of the antisymmetric matrix $D_a$ (starting from the theoretical model) takes place essentially the same way with a calibration cube 23 having planar calibration surfaces which are parallel to the coordinate planes, that is, aligned to the planes: x-y plane, x-z plane and y-z plane. The evaluation of comprehensive test measurements has shown that the complete dynamic correction for the measurement of planar surfaces is not possible in any desired spatial orientation. The correction is however not necessary in this context because a probe of specific configuration is utilized for the measurement of respective planar workpiece surfaces. The correction and consequently also the dynamic calibration is then sufficient for the actual spatial orientation. This limitation means the calibration of only two antisymmetrical coefficients of $D_a$ on a planar surface with the respective spatial orientation.

Figure 10:
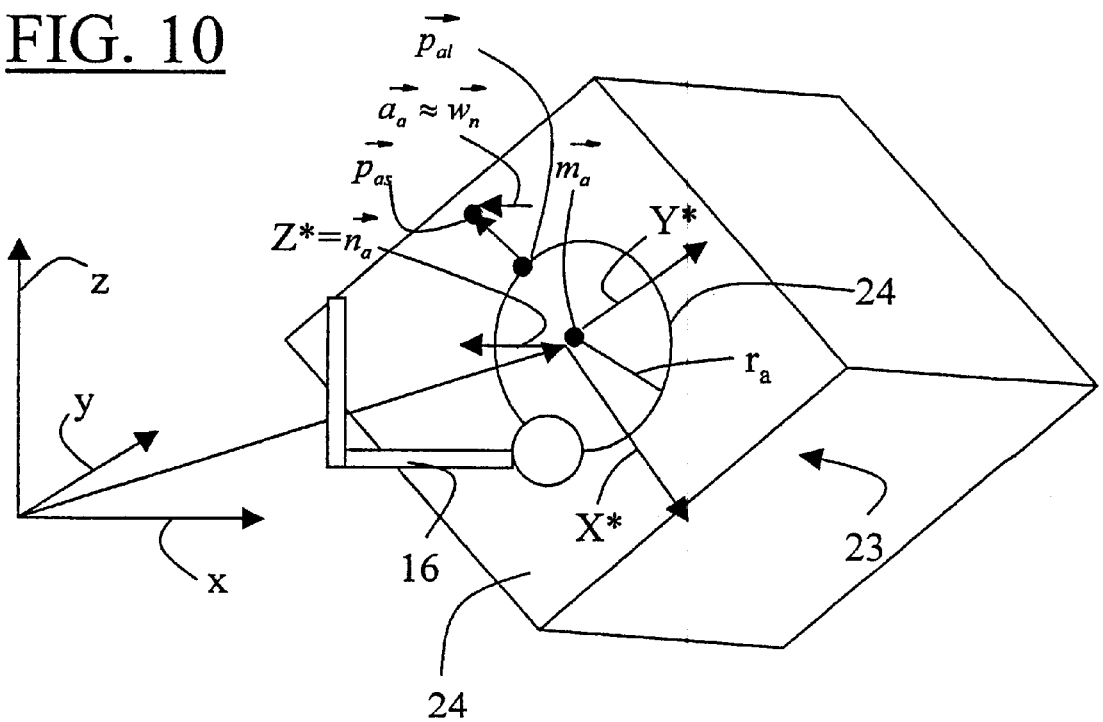
FIG. 10 is a schematic showing the basic principle for the calibration of the antisymmetrical matrix $D_a$.

FIG. 10 shows the measurement arrangement as well as the model for the calibration. Here, first the plane 25 of a cube 23 is quasi-statically measured along a circular path 24, that is, at a very low measuring speed $v_1$. The diameter of the circular path 24 corresponds approximately to the diameter of the calibration sphere 18. A compensating circle having the center point $\vec{m}_a$ and radius $r_a$ and a surface normal $\vec{n}_a$ is determined from the measurement values. Thereafter, the circular path is scanned at a high measuring speed $v_s$. A measured measurement point $\vec{p}_{as}$ then has the spacing $\vec{a}_a$ from the plane in accordance with the following equation.

$$a_a = \vec{n}^T (\vec{p}_{as} - \vec{m}_a) \qquad \text{Equation 15}$$

For the computation of the matrix $D_a$, one introduces a local coordinate system having the coordinate directions ($x^*, y^*, z^*$) having the surface normal $\vec{n}_a$ as axis $z^*$. The following transformation equation having transformation matrix T applies between the coordinate systems (x, y, z) and ($x^*, y^*, z^*$) which is to be determined from the normal vector $\vec{n}_a$.

$$\vec{p}_{as}^* = T(\vec{p}_{as} - \vec{m}_a) \qquad \text{Equation 16}$$

For the spacing ($a_a = w_n$) of a measurement point $\vec{p}_a$ in the normal direction, the following applies to the same extent in both coordinate systems:

$$\vec{w}_n = \vec{n}^T D_a \vec{b} = \vec{n}^T D_a^* \vec{b}.$$ Equation 17

From this, the transformation relationship for the dynamic matrix follows:

$$D_a = T^T D_a^* T$$ Equation 18

The distance $\vec{a}_a$ is, as explained above, the z component of the displacement vector $\vec{w}_{ges}$ so that Equation 17 can be reduced to the following expression:

$$w_n = \begin{pmatrix} -d_{a13}^* & -d_{a23}^* & 0 \end{pmatrix} \begin{pmatrix} b_x \\ b_y \\ b_z \end{pmatrix}$$ Equation 19

The normal equation system for the two coefficients then follows:

$$\sum_{i=1}^{n} \begin{pmatrix} b_x^* \\ b_y^* \end{pmatrix} (b_x^* \quad b_x^*) \begin{pmatrix} d_{13}^* \\ d_{23}^* \end{pmatrix} = \sum_{i=1}^{n} \begin{pmatrix} b_x^* \\ b_y^* \end{pmatrix} \vec{a}_{ai}$$ Equation 20 and yields directly the sought-after antisymmetric dynamic matrix $D_a$.

$$D_a^* = \begin{pmatrix} 0 & 0 & d_{a13}^* \\ 0 & 0 & d_{a23}^* \\ -d_{a13}^* & -d_{a23}^* & 0 \end{pmatrix}$$ Equation 21

The antisymmetric dynamic matrix $D^*_a$ which is obtained is thereafter to be transformed with Equation 18 into the measurement coordinate system (x, y, z). The resulting dynamic matrix D then results from the addition of the three components ($D_0$, $D_s$ and $D_a$) of Equation 7.

When a complete correction of all dynamic deformations is to be made, the probe calibration must be carried out in sequence in the following three steps for the static and dynamic calibration of the static bending tensor N and of the dynamic tensor D:

a) Static probe calibration on the calibration sphere (probe diameter, probe offset, bending tensor) as well as computing the approximation $D_0$ of the dynamic tensor. The actual dynamic tensor is $D=D_0$ after successful calibration.

b) Determination of the symmetric supplementing matrix $D_s$ of the dynamic tensor for the correction of dynamic errors with the measurement of the bores, waves, spheres, and the like. The actual dynamic tensor D is $D=D_0+D_s$ after successful calibration.

c) Determination of the antisymmetric supplementing matrix $D_a$ of the dynamic tensor for the correction of dynamic errors with the measurement of planes having approximately the same spatial orientation, truncated cones, et cetera. The actual dynamic tensor D is $D=D_0+D_s+D_a$ after successful calibration.

The individual calibration steps have to be carried out in this sequence and, after each step, the last determined supplementing matrix ($D_s$, $D_a$) has to be added to the last determined dynamic tensor D.

The calibration can, however, also be interrupted after the first or second step and residual errors then remain. For the user, the possibility is present to select the probe calibration in dependence upon the measurement task. For a measurement task, for example, where almost no tangential deviation is to be expected (for example, when measuring a bore), one can omit the antisymmetric rotational matrix $D_a$.

Any desired dynamic matrix can also be used selectively. For example, only the symmetrical supplementing matrix $D_s$ could be calibrated. What is disadvantageous here, however, is that larger measurement errors could result especially in dependence upon the particular measuring task.

Figure 12:
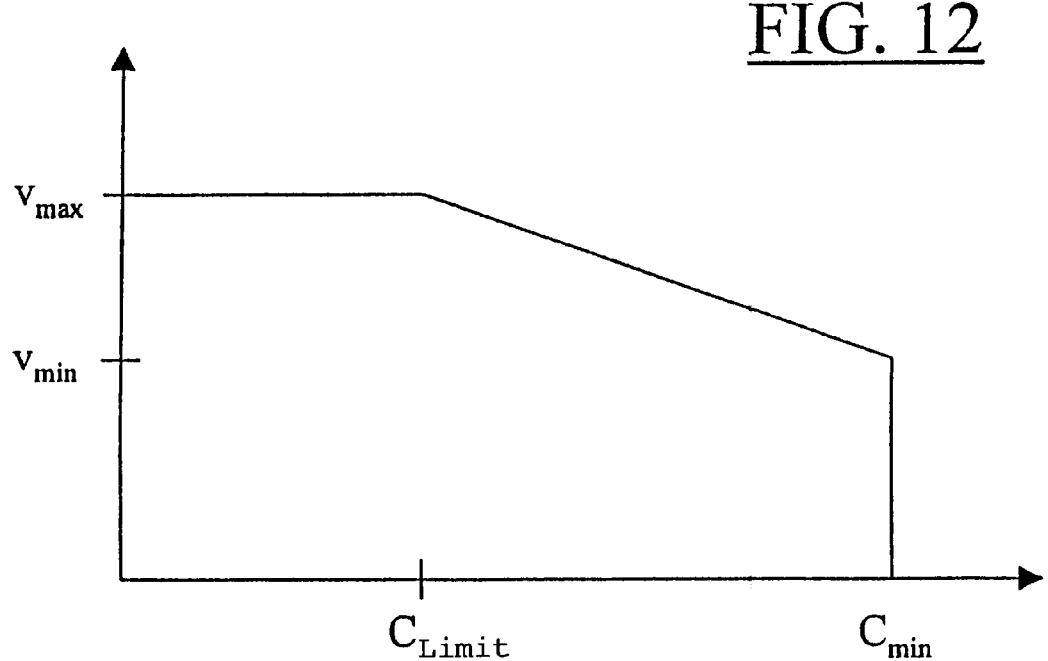
FIG. 12 is a graph showing the permissible measurements being plotted in dependence upon the dynamic stiffness; and, FIG. 13 is a graph showing the permissible measuring velocity plotted as a function of the probe pin mass.

Furthermore, the permissible measuring speed should be changed in the coordinate measuring apparatus in dependence upon the dynamic stiffness which is stored in the calibrated dynamic tensor. As shown in FIG. 12, the maximum permissible measuring speed ($v_{max}$) can be permitted up to a dynamic stiffness (Climit). Thereafter, the permissible measuring speed is reduced in a transition region to $v_{min}$ for ever smaller stiffness. For stiffnesses less than Cmin, either the measuring sequence is not carried out at all or a corresponding announcement is outputted to the user.

Figure 13:
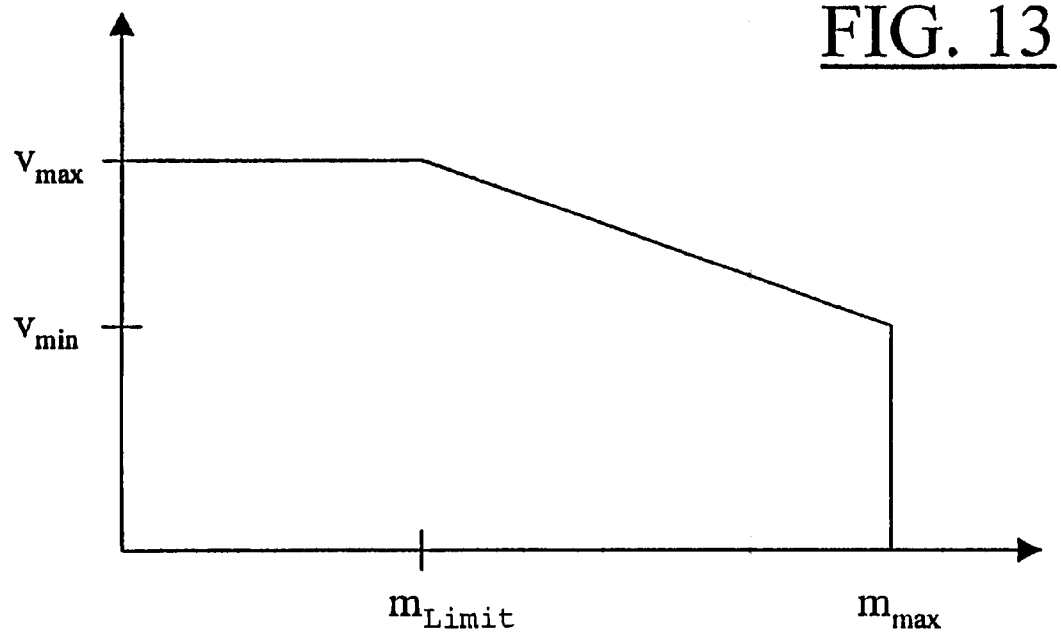

Furthermore, the measuring speed should be changed in dependence upon the mass of the probe pin (13 or 16). As shown in FIG. 13, the maximum permissible measuring speed $v_{max}$ can be permitted up to a probe pin mass $m_{limit}$. Thereafter, the permissible measuring speed is reduced for ever increasing probe pin mass in a transition region to $v_{min}$. For probe pin masses greater than $m_{max}$, either the measuring sequence is not carried out at all or a corresponding announcement is outputted to the user.

The reduction of the permissible measuring speeds takes place in dependence upon the stiffness as well as in dependence upon the probe pin mass. Accordingly, if the permissible measuring speed is reduced because the stiffness drops below the value Climit then this already reduced measuring speed is still further reduced when, additionally, the probe pin mass exceeds the value $m_{limit}$.

It is understood that the foregoing description is that of the preferred embodiments of the invention and that various changes and modifications may be made thereto without departing from the spirit and scope of the invention as defined in the appended claims.

What is claimed is:

1. A method for correcting a measurement result of a coordinate measuring apparatus wherein a workpiece is continuously scanned with a probe having a dynamic bending characteristic, the method comprising the steps of:

determining a parameter field defining said dynamic bending characteristic of said probe from at least one of the following: a product of the static bending tensor ($N_T$) of said probe and the mass tensor ($M_T$+mE) of said probe; and, deviations accompanying an acceleration of said probe normal to the surface of said workpiece;

computing corrective values from said parameter field while considering the acceleration ($\vec{b}$) of said probe; and, correcting said measurement with said corrective values.

2. The method of claim 1, wherein said parameter field is determined by at least one of the following: computation and dynamic calibration.

3. The method of claim 2, wherein said parameter field includes a plurality of component fields ($D_M$, $D_s$, $D_a$) and at least one of said component fields is calibrated for correction.

4. The method of claim 1, wherein the component field ($D_s$) of said parameter field describes the deviations when accelerating said probe normal to said surface of said workpiece; and, the parameters of said parameter field are determined by continuously scanning a rotationally symmetrical calibration body at different velocities ($v_1$, $v_s$).

5. The method of claim 4, wherein said rotationally symmetrical calibration body is a calibration sphere; and, at least three large circles are continuously scanned at different velocities ($v_1$, $v_s$) to determine the parameters of said parameter field.

6. The method of claim 1, wherein said parameter field includes a component field ($D_a$) and said component field ($D_a$) of said parameter field additionally defines the deviations for the tangential acceleration of said probe relative to the surface of said workpiece; and, the parameters of said parameter field are determined by scanning a curved path on a calibration plane which is orientated parallel to the workpiece surface to be measured; and, wherein said scanning takes place in accordance with one of the following additional steps:

scanning one and the same curved path at different velocities; or, scanning a path having different curvatures at a fixed velocity.

7. The method of claim 6, wherein the parameters of said parameter field are determined by measuring a small circle on a calibration sphere at different velocities in at least one calibration plane.

8. The method of claim 1, wherein measurement points are recorded during calibration or in a later measuring operation; and, said measuring points are determined to be valid or invalid in dependence upon the measured acceleration and/or the measured measuring force.

9. The method of claim 8, wherein an angle ($\alpha_i$) is computed between an acceleration vector ($\vec{b}_{ki}$) or a measurement force vector and a normal vector ($\vec{n}_{ki}$) of the surface of said workpiece at measurement point ($p_{ki}$); and, a measurement point is determined as valid when said angle ($\alpha_i$) drops below or exceeds a predefined value.

10. The method of claim 1, wherein the maximum permissible measuring speed is determined while considering the dynamic stiffness of the probe and the probe mass.

11. A coordinate measuring apparatus for measuring a workpiece, the coordinate measuring apparatus comprising:

a probe for continuously scanning the surface of the workpiece for supplying corresponding measurement values;

a measuring mechanical assembly for displacing said probe and said workpiece relative to each other in three coordinate directions;

an evaluation unit wherein measuring results are evaluated and corrected;

said evaluation unit functioning to:

determine a parameter field defining said dynamic bending characteristic of said probe from at least one of the following: a product of the static bending tensor ($N_T$) of said probe and the mass tensor ($M_T$+ mE) of said probe; and, deviations accompanying an acceleration of said probe normal to the surface of said workpiece;

compute corrective values from said parameter field while considering the acceleration ($\vec{b}$) of said probe; and, correct said measurement with said corrective values.

12. The coordinate measuring apparatus of claim 11, wherein said parameter field is determined by at least one of the following: computation and dynamic calibration.

13. The coordinate measuring apparatus of claim 12, wherein said parameter field includes a plurality of component fields ($D_M$, $D_s$, $D_a$) and at least one of said component fields is calibrated for correction.

14. The coordinate measuring apparatus of claim 11, wherein the component field ($D_s$) of said parameter field describes the deviations when accelerating said probe normal to said surface of said workpiece; and, the parameters of said parameter field are determined by continuously scanning a rotationally symmetrical calibration body at different velocities ($v_1$, $v_s$).

15. The coordinate measuring apparatus of claim 14, wherein said rotationally symmetrical calibration body is a calibration sphere; and, at least three large circles are continuously scanned at different velocities ($v_1$, $v_s$) to determine the parameters of said parameter field.

16. The coordinate measuring apparatus of claim 11, wherein said parameter field includes a component field ($D_a$) and said component field ($D_a$) of said parameter field additionally defines the deviations for the tangential acceleration of said probe relative to the surface of said workpiece; and, the parameters of said parameter field are determined by scanning a curved path on a calibration plane which is orientated parallel to the workpiece surface to be measured; and, wherein said scanning takes place in accordance with one of the following additional steps:

scanning one and the same curved path at different velocities; or, scanning a path having different curvatures at a fixed velocity.

17. The coordinate measuring apparatus of claim 16, wherein the parameters of said parameter field are determined by measuring a small circle on a calibration sphere at different velocities in at least one calibration plane.

18. The coordinate measuring apparatus of claim 11, wherein measurement points are recorded during calibration or in a later measuring operation; and, said measuring points are determined to be valid or invalid in dependence upon the measured acceleration and/or the measured measuring force.

19. The coordinate measuring apparatus of claim 18, wherein an angle ($\alpha_i$) is computed between an acceleration vector ($\vec{b}_{ki}$) or a measurement force vector and a normal vector ($\vec{n}_{ki}$) of the surface of said workpiece at measurement point ($p_{ki}$); and, a measurement point is determined as valid when said angle ($\alpha_i$) drops below or exceeds a predefined value.

20. The coordinate measuring apparatus of claim 18, wherein the maximum permissible measuring speed is determined while considering the dynamic stiffness of the probe and the probe mass.

* * * * *

UNITED STATES PATENT AND TRADEMARK OFFICE
CERTIFICATE OF CORRECTION

PATENT NO. : 6,591,208 B2
DATED : July 8, 2003
INVENTOR(S) : Werner Lotze and Ralf Bernhardt It is certified that error appears in the above-identified patent and that said Letters Patent is hereby corrected as shown below:

<u>Column 4,</u>
Line 1, delete "workpiece 5" and substitute -- workpiece 5, -- therefor.

Line 46, delete "$|\vec{b}|=|\vec{v}|/^2 r$" and substitute -- $|\vec{b}|=|\vec{v}|^2/r$ -- therefor.

Line 55, delete "$\vec{b} = \begin{pmatrix} b_x \\ h_y \\ h_z \end{pmatrix} = \begin{pmatrix} \ddot{x} \\ \ddot{y} \\ \ddot{z} \end{pmatrix}$" and substitute -- $\vec{b} = \begin{pmatrix} b_x \\ b_y \\ b_z \end{pmatrix} = \begin{pmatrix} \ddot{x} \\ \ddot{y} \\ \ddot{z} \end{pmatrix}$ -- therefor.

<u>Column 11,</u>
Line 1, delete "$\vec{w}_n = \vec{n}^T D_a b = \vec{n}^{\bullet T} D_a^\bullet \vec{b}^\bullet$"

and substitute -- $\vec{w}_n = \vec{n}^T D_a \vec{b} = \vec{n}^{*T} D_a^* \vec{b}^*$ -- therefor.

Signed and Sealed this

Seventeenth Day of February, 2004

JON W. DUDAS
*Acting Director of the United States Patent and Trademark Office*